106. COMPOSITIONS, COATING OR PLASTIC.

UNITED STATES PATENT OFFICE.

JEFF D. BELCHER AND MARION J. HENDLEY, OF BEN WHEELER, TEXAS, ASSIGNORS OF ONE-THIRD TO J. A. REYNOLDS, OF SAME PLACE.

COMPOSITION FOR CONCRETE TOMBSTONES.

SPECIFICATION forming part of Letters Patent No. 567,562, dated September 8, 1896.

Application filed December 6, 1895. Serial No. 571,310. (No specimens.)

*To all whom it may concern:*

Be it known that we, JEFF D. BELCHER and MARION J. HENDLEY, citizens of the United States, residing at Ben Wheeler, in the county of Van Zandt and State of Texas, have invented a new and useful Composition for Concrete Tombstones, of which the following is a specification.

This invention relates to concrete tombstones, and it has for its object to provide a new and useful composition of matter for concrete tombstones and a process for manufacturing the same whereby a perfectly white substantial rock will be produced that will be very durable, will not be liable to peeling, cracking, or turning dark, but will bleach out in the weather and become very solid, so as to form a permanent and substantial tombstone.

The concrete tombstones heretofore manufactured are open to many objections, principal among which is that most concrete tombstone compositions produce a dark rock, which, in order to be whitened, must be painted, and such paint in time will necessarily peel and crack and give a very shabby appearance to the rock. Furthermore, the tombstone compositions in ordinary use must generally be allowed to completely harden in the mold before the latter is removed and before any lettering is made on the tombstone, and in this process of manufacturing the molded tombstone is left very rough, so that it cannot be smoothed with a trowel or the like; and, furthermore, the stone dries first on the outside while the interior portions are still wet, so that during the drying of such interior portions cracks are produced on the outside of the stone.

The objections to the ordinary concrete tombstones above noted are avoided by the present invention, and the composition of matter employed in carrying out the invention is composed of sand, cement, starch, buttermilk, plaster-of-paris, and water. In mixing the ingredients of the composition equal parts of sand and cement in a dry state are thoroughly mixed together, and then a separate mixture is made of the starch, buttermilk, plaster-of-paris, and water, equal parts of which last-named ingredients are also used. The mixture of starch, buttermilk, plaster-of-paris, and water is introduced into the dry mixture of sand and cement until the entire mass becomes homogeneous and paste-like. After the mixture of the ingredients of the composition, the first step of the process is to introduce the mass into a suitable mold, according to the shape to be given the completed tombstone. As soon as the paste-like mass has been shaped within the mold, the latter is removed while the mass of artificial rock is still in a soft condition, and then the desired lettering or inscription is stamped or otherwise made in the soft rock. While the artificial stone is still in the soft condition, after the removal of the mold, the stone is smoothed off perfectly with a trowel or other suitable tool, and the stone is then ready to be allowed to dry and set. At this point a wet cloth is placed around the entire molded tombstone, said cloth being either previously made wet with water or the stone being sprinkled with water before the cloth is wrapped therearound. Being surrounded with a wet cloth, the stone will dry evenly throughout and at the same time, thereby avoiding the disadvantages resulting from the uneven drying of artificial-stone composition.

An artificial tombstone made of the hereindescribed composition of matter and by the process described will not only possess the characteristics already noted, but particularly by reason of the use of the ingredients starch and buttermilk will have an entirely uniform white color and a very high white gloss, making the composition of matter especially desirable for tombstone work.

Having thus described the invention, what is claimed, and desired to be secured by Letters Patent, is—

1. A process for the manufacture of concrete material for tombstones which consists in mixing together equal parts of starch, buttermilk, plaster-of-paris and water, and combining the resulting mixture with a mixture of sand and cement, substantially as set forth.

2. A composition of matter for concrete tombstones composed of starch, buttermilk, plaster-of-paris, water, sand, and cement, combined in the proportions substantially as described.

In testimony that we claim the foregoing as our own we have hereto affixed our signatures in the presence of two witnesses.

JEFF D. BELCHER.
MARION J. HENDLEY.

Witnesses:
J. D. MATTHEWS,
O. D. MCCARTY.